United States Patent
Schiek et al.

(10) Patent No.: US 11,190,084 B2
(45) Date of Patent: Nov. 30, 2021

(54) ELECTRIC MACHINE FOR A MOTOR VEHICLE AND METHOD FOR COOLING AN ELECTRIC MACHINE

(71) Applicant: Dr. Ing. h.c. F. Porsche Aktiengesellschaft, Stuttgart (DE)

(72) Inventors: Werner Schiek, Jettingen (DE); Leo Spiegel, Vaihingen/Enz (DE); Holger Hinrich, Leonberg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 136 days.

(21) Appl. No.: 14/735,180

(22) Filed: Jun. 10, 2015

(65) Prior Publication Data

US 2015/0357882 A1 Dec. 10, 2015

(30) Foreign Application Priority Data

Jun. 10, 2014 (DE) .................... 10 2014 108 100.5

(51) Int. Cl.
*H02K 9/04* (2006.01)
*B60H 1/00* (2006.01)
(Continued)

(52) U.S. Cl.
CPC ............ *H02K 9/04* (2013.01); *B60H 1/00385* (2013.01); *B60H 1/02* (2013.01); *B60H 1/143* (2013.01);
(Continued)

(58) Field of Classification Search
CPC ........ H02K 9/04; H02K 9/19; H02K 2213/09; B60H 1/02; B60H 1/143; B60H 1/00385;
(Continued)

(56) References Cited

U.S. PATENT DOCUMENTS

| 5,707,667 A * | 1/1998 | Galt | ........................ | B29C 45/72 |
| | | | | 425/589 |
| 5,859,482 A * | 1/1999 | Crowell | .................... | H02K 5/20 |
| | | | | 310/54 |

(Continued)

FOREIGN PATENT DOCUMENTS

| CN | 103280903 A | 9/2013 |
| DE | 11 2012 004 272 | 7/2004 |

(Continued)

OTHER PUBLICATIONS

Chinese Office Action dated May 3, 2017.
German Examination Report of Mar. 3, 2021.
German Search Report of Mar. 3, 2021.

*Primary Examiner* — Steven B McAllister
*Assistant Examiner* — John E Bargero
(74) *Attorney, Agent, or Firm* — Gerald E. Hespos; Michael J. Porco; Matthew T. Hespos

(57) ABSTRACT

An electric machine (14, 16) for a drive train (12) of a motor vehicle (10) has a coil arrangement and a rotor mounted rotatably relative to the coil arrangement. A fluid line is connected thermally to at least one component of the electric machine (14,16) to supply a cooling fluid (36) to the electric machine (14, 16) and to cool the at least one component. A fan (30, 32) is designed to supply cooling air (42) to the electric machine for cooling the electric machine (14, 16), and a control unit (34) controls the fan (30, 32). The control unit (34) controls the fan arrangement (30, 32) and the cooling air supply depending on a speed (n) and/or a torque (M) of the electric machine (14, 16).

9 Claims, 1 Drawing Sheet

(51) Int. Cl.
   *B60H 1/14* (2006.01)
   *B60K 11/06* (2006.01)
   *B60K 11/02* (2006.01)
   *B60K 1/00* (2006.01)
   *B60H 1/02* (2006.01)
   *H02K 9/19* (2006.01)

(52) U.S. Cl.
   CPC ............... *B60K 1/00* (2013.01); *B60K 11/02* (2013.01); *B60K 11/06* (2013.01); *H02K 9/19* (2013.01); *B60K 2001/006* (2013.01); *H02K 2213/09* (2013.01)

(58) Field of Classification Search
   CPC .......... B60K 11/02; B60K 1/00; B60K 11/06; B60K 2001/006
   USPC ..................................................... 237/12.3 R
   See application file for complete search history.

(56) References Cited

U.S. PATENT DOCUMENTS

| | | | |
|---|---|---|---|
| 2007/0216236 A1* | 9/2007 | Ward | H02K 3/24 310/54 |
| 2008/0001486 A1 | 1/2008 | Smith | |
| 2009/0176150 A1* | 7/2009 | Yanaka | B60H 1/00278 429/120 |
| 2009/0289583 A1 | 11/2009 | Yoshida | |
| 2010/0065355 A1* | 3/2010 | Reddy | B60K 1/02 180/65.31 |
| 2012/0019664 A1 | 1/2012 | Watanabe | |
| 2012/0230843 A1* | 9/2012 | Ravipati | G05D 23/1932 417/46 |
| 2012/0253735 A1* | 10/2012 | Hyde | F04D 29/586 702/130 |
| 2014/0110489 A1* | 4/2014 | Yasui | B60H 1/00285 237/5 |
| 2015/0028727 A1 | 1/2015 | Watanabe et al. | |
| 2015/0231988 A1* | 8/2015 | Hisada | B60L 1/003 318/139 |
| 2016/0134177 A1* | 5/2016 | Itoh | H02K 9/06 105/59 |
| 2021/0021176 A1* | 1/2021 | Sakurai | H02K 5/128 |

FOREIGN PATENT DOCUMENTS

| | | |
|---|---|---|
| DE | 10 2009 000 591 | 8/2010 |
| JP | H01174235 A | 7/1989 |
| JP | H02227316 A | 9/1990 |
| JP | H03040733 A | 2/1991 |
| JP | H06171346 A | 6/1994 |
| JP | 2006187105 A | 7/2006 |
| JP | 2007-53858 | 3/2007 |
| JP | 2009118686 A | 5/2009 |

* cited by examiner

ELECTRIC MACHINE FOR A MOTOR VEHICLE AND METHOD FOR COOLING AN ELECTRIC MACHINE

CROSS REFERENCE TO RELATED APPLICATION

This application claims priority under 35 USC 119 to German Patent Appl. No. 10 2014 108 100.5 filed on Jun. 10, 2014, the entire disclosure of which is incorporated herein by reference.

BACKGROUND

1. Field of the Invention

The invention relates to an electric machine for a drive train of a motor vehicle, comprising a coil arrangement, a rotor mounted rotatably relative to the coil arrangement, a fluid line thermally connected to at least one component of the electric machine to supply a cooling fluid to the electric machine for cooling the at least one component of the electric machine, a fan to supply cooling air to the electric machine to cool the electric machine, and a control unit for controlling the fan. The invention also relates to a method for cooling such an electric machine of a motor vehicle. The invention further relates to a motor vehicle comprising a drive train with such an electric machine for providing drive power.

2. Description of the Related Art

Electric machines have been used in a hybrid drive or a purely electric drive for driving individual wheels or an axle of a motor vehicle. These electric machines supply high electric currents to the electric machines. Thus, a large quantity of heat is generated in the field coils of the electric machine, and this heat needs to be dissipated to avoid thermal overloading of the electric machine and at the same time to apply a relatively high electric power to the electric machine.

The electric machines generally are connected to a cooling water circuit of the motor vehicle to supply cooling water to the electric machines and thus to cool the electric machines by a motor vehicle cooling device.

The field coils of the electric machines can have a very high electric power loss in particular driving situations of a motor vehicle and therefore heat up considerably within a short period of time. Cooling water cooling cannot provide sufficient cooling power in these situations. Also, there may be no correspondingly heat-controlled cooling fluid available in particular situations, such as after starting the motor vehicle at high external temperatures. Further cooling must be provided in addition to the cooling water cooling to avoid overheating in these situations. Cooling of an electric machine of a motor vehicle by water cooling and air cooling is known from DE 10 2009 000 591 A1. However, the additional cooling of the electric machines for driving the motor vehicle has a high energy demand and thus the energy consumption of the motor vehicle is increased.

An object of the invention is to provide an electric machine for a motor vehicle that can be cooled effectively and with a low consumption of energy.

SUMMARY

The above-described object is achieved by an electric machine with a control unit designed to control the fan and the cooling air supply depending on a speed and/or a torque of the electric machine. This object also is achieved by a motor vehicle with such an electric machine and control unit. This object further is achieved by a method that controls the fan arrangement and the cooling air supply depending on a speed and/or a torque of the electric machine.

Controlling the fan and the cooling air supply depending on a speed and/or a torque of the electric machine enables additional cooling to be supplied to the electric machine as required so that increased waste heat can be dissipated. As a result, peak loads can be absorbed and thermal overloading of the electric machine can be avoided in particular driving situations of the motor vehicle. Therefore, the electric machine can be cooled effectively and as required with little technical complexity.

The control unit may be designed to control a supply of the cooling fluid into the fluid line depending on a speed and/or a torque of the electric machine. As a result, cooling by the cooling fluid can be matched, as required, to the power loss of the electric machine so that the efficiency of the cooling also can be increased.

The control unit may be designed to activate or deactivate the fan and/or the fluid supply depending on the speed and/or the torque. As a result, control of the different types of cooling can be realized with little technical complexity since the fan and/or the fluid supply merely needs to be switched on or off.

The control unit may be designed to activate the fan arrangement below a predefined speed of the electric machine. As a result, additional cooling power can be provided, for example, during runup of the motor vehicle when a high power loss occurs, with a low level of technical complexity.

The control unit may be designed to deactivate the fluid supply above a predefined speed and below a predefined torque of the electric machine. As a result, matching can be performed for high speeds and low torques when the electric machine has low electric power losses so that the energy consumption of the cooling of the electric machine can be reduced further.

The fluid line may be connected to a cooling circuit, and the control unit may be designed to control the cooling circuit in order to control the fluid supply. As a result, the cooling fluid supply can be controlled with little technical complexity.

The fan may designed to suck in ambient air and supply it to the electric machine as cooling air. As a result, cooling air can be provided with little technical complexity.

The fan may be designed to supply heated exhaust air from the electric machine to at least one component of the motor vehicle. As a result, the heated exhaust air can be used for heating the at least one component of the motor vehicle, such as, for example, an interior of the motor vehicle. Therefore, energy consumption in the motor vehicle can be reduced further and the efficiency can be increased further.

An air filter may be assigned to the fan arrangement to filter the sucked-in ambient air. As a result, the heated exhaust air from the electric machine has been filtered and can be passed, for example, in the interior of the motor vehicle to heat the interior.

The motor vehicle may have a ventilation arrangement of an interior connected to the fan of the electric machine so that heated exhaust air from the electric machine can be supplied to the interior. As a result, the heated exhaust air of the electric machine can be used and the energy consumption of the motor vehicle can be reduced.

The features mentioned above and those yet to be mentioned below can be used in the respectively cited combination and in other combinations or on their own without departing from the scope of the invention.

Exemplary embodiments of the invention are illustrated in the drawings and will be explained in more detail in the description below.

DETAILED DESCRIPTION

Figure 1:
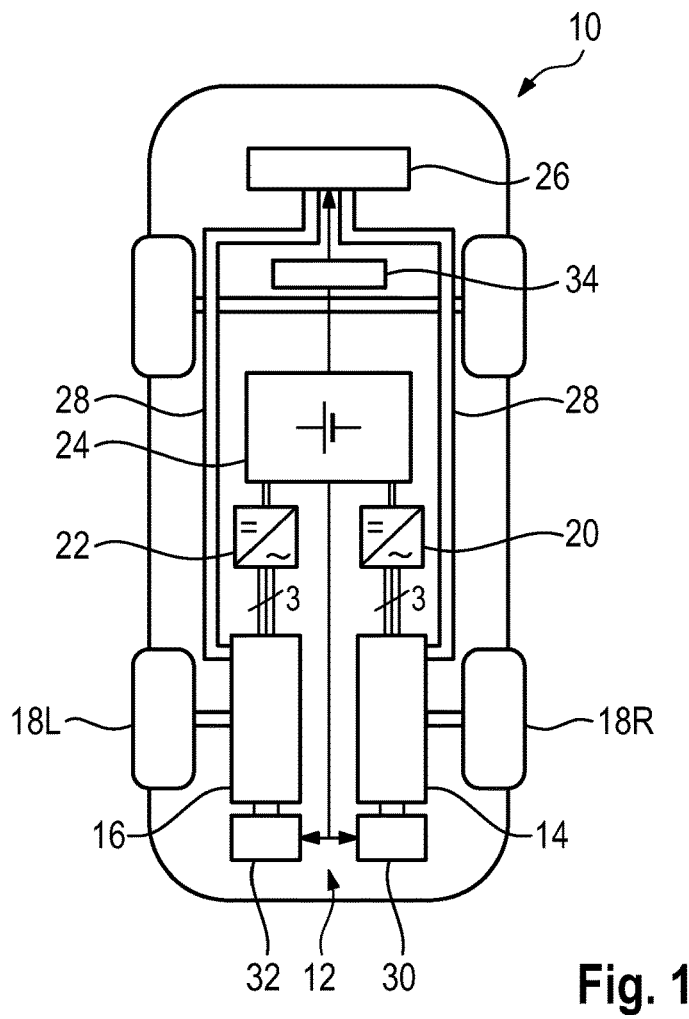
FIG. 1 is a schematic view of a motor vehicle comprising an electric drive and additional air cooling.

A motor vehicle in accordance with the invention is illustrated schematically in FIG. 1 and is denoted generally by the numeral 10. The motor vehicle 10 has a drive train 12, which in the present case contains two electric machines 14, 16 for providing drive power. The drive train 12 is used for driving driven wheels 18L, 18R of the motor vehicle 10. The electric machines 14, 16 provide a torque M to the driven wheels 18L, 18R and rotate with a speed n.

The electric machines 14, 16 are each connected to a DC voltage source 24 via inverters 20, 22. The DC voltage source 24 is in the form of a rechargeable battery. The inverters 20, 22 convert the DC voltage provided by the battery 24 or the provided direct current in each case into three-phase alternating current and correspondingly actuating or energizing the electric machines 14, 16.

In the embodiment of FIG. 1, the drive train 12 has only the two electric machines 14, 16 as drive assemblies. In an alternative embodiment, the drive train 12 can be a parallel or series hybrid drive train, in which drive power can be provided mechanically or electrically at least partially by an internal combustion engine.

In the embodiment illustrated in FIG. 1, in each case one of the driven wheels 18L, 18R is connected mechanically to one of the electric machines 14, 16 via a shaft. It goes without saying that the driven wheels 18L, 18R can also be driven by a single electric machine 14, 16 with the driven wheels 18L, 18R then being connected to the output shaft of the electric machine 14, 16 via a corresponding differential gear mechanism.

The motor vehicle 10 has a liquid cooling device 26 designed to supply a cooling liquid to components of the drive train 12 via a cooling circuit 28 and to cool the components. The electric machines 14, 16 are connected to the cooling circuit 28 so that the electric machines 14, 16 can be cooled by the cooling liquid of the liquid cooling device 26. In particular, in this case heat exchangers are provided in the electric machines 14, 16 to ensure the transport of heat between the cooling liquid and, for example, the field coils of the electric machines 14, 16.

The components of the electric machines 14, 16 and in particular the field coils of the electric machines 14, 16 are heated considerably in particular driving and drive situations by particularly high electric currents. Thus, additional cooling power needs to be provided to the electric machines 14, 16 to ensure cooling of the electric machines 14, 16 and to prevent thermal overloading.

In addition to the liquid cooling by the liquid cooling device 26, a fan 30, 32 or blower 30, 32 is assigned to each electric machine 14, 16. The fans or blowers 30, 32 are controlled by a central control unit 34 and supply cooling air to the electric machines 14, 16 to cool the electric machines 14, 16 in addition to the liquid cooling.

The fans 30, 32 provide additional cooling power to cool, the electric machines 14, 16, for example after starting the motor vehicle 10 when there may not be sufficient temperature-controlled cooling liquid available due to high external temperatures. Thus, the electric machines 14, 16 can provide the maximum power during runup and thermal overloading of the components can be avoided.

The cooling power of the liquid cooling device 26 generally can provide sufficient cooling power in normal drive states of the electric machines 14, 16. However, the fans 30, 32 are actuated by the control unit 34 depending on the power loss of the electric machines 14, 16 so that air cooling can be provided as required.

The control unit 34 is connected to the electric machines 14, 16 and/or the inverters 20, 22 to detect the speed n of the electric machines 14, 16 and/or the provided torque M of the electric machines 14, 16 and to actuate the fans 30, 32 depending on the detected speed n and/or the detected torque M and to supply cooling air to the electric machines 14, 16 correspondingly. The electric power loss of the electric machines 14, 16 is speed-dependent or torque-dependent. Thus, the requirement for additional cooling power can be determined using simple means on the basis of the detected speed n or the detected torque M, and the fans 30, 32 can be actuated correspondingly.

The fans 30, 32 may be connected, as required, and switched off if no additional cooling power is required.

The fans 30, 32 preferably are connected at low speeds when a high torque is required or a high required torque is to be expected. The fans 30, 32 therefore are switched on for speeds below a predefined speed by the control unit 34.

At higher speeds, when the required torque is low, the required cooling power is correspondingly lower. As a result, no additional air cooling is required or else the cooling can provide additional air cooling via fan wheels on a rotor of the electric machines 14, 16, so that the air cooling by the fans 30, 32 is not required. Therefore, the fans 30, 32 may be switched off above the predefined speed.

The control unit 34 additionally is connected to the liquid cooling device 26 to control the supply of cooling liquid to the electric machines 14, 16. In situations when the speed of the electric machines 14, 16 is above the predefined speed and the torque is below a predefined torque, no cooling of the electric machines 14, 16 is required. As a result the supply of cooling liquid by the liquid cooling device 26 can be interrupted.

Overall, therefore, requirement-dependent cooling of the electric machines 14, 16 can be provided to reduce the energy consumption in the motor vehicle 10 since additional cooling power is provided only in particular driving situations.

The additional air cooling and the corresponding control also apply to or are applicable to a generator operating mode of the electric machines 14, 16.

Figure 2:
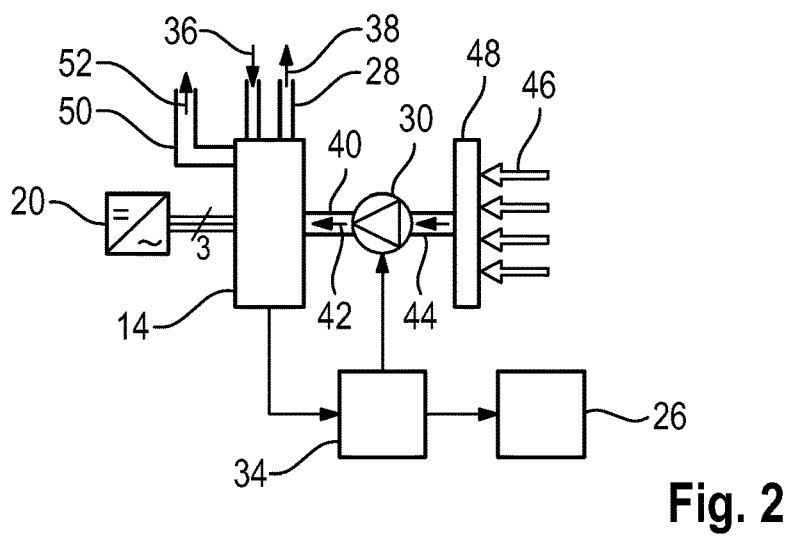
FIG. 2 is a schematic detail drawing of air cooling of an electric drive machine for a motor vehicle.

FIG. 2 illustrates schematically the electric machine 14 together with the fan 30 for explaining the mode of operation.

The electric machine 14 is actuated or energized in three-phase fashion by the inverter 20 to provide corresponding drive power at the driven wheel 18R. The electric machine is connected to the cooling circuit 28 so that a cold cooling liquid 36 is supplied to the electric machine 14 and correspondingly heated cooling liquid 38 is dissipated.

In addition, the electric machine 14 is connected to the fan 30 via a fan pipe 40 to supply cooling air 42 to the electric machine. The fan 30 sucks in ambient air 46 via a suction pipe 44, and this ambient air is filtered via an air filter 48.

The fan 30 is actuated via the control unit 34 that is connected to the electric machine 14 to detect the speed n of the electric machine 14 and/or the torque M of the electric machine 14. The electric machines 14, 16 can each have a torque sensor and a speed sensor to detect the torque and the speed of the electric machine 14, 16. The control unit 34 further is connected to the liquid cooling device 26 to control correspondingly the liquid cooling device 26 on the basis of the detected speed n and the detected torque M and to control or set correspondingly the cooling liquid supply to the electric machine 14 via the cooling circuit 28. As a result, overall requirement-dependent cooling of the electric machine 14 can be achieved.

In a particular embodiment, an exhaust air pipe 50 of the electric machine 14 is designed to provide heated exhaust air 52 to a component of the motor vehicle 10 to heat this component. Preferably, the exhaust air 52 is introduced into the interior of the motor vehicle 10 or the passenger compartment of the motor vehicle 10 to heat the interior or the passenger compartment, as required. The air filter 48 ensures that the exhaust air 52 can be introduced directly into the passenger compartment without dust or other particles entering the passenger compartment. Overall, therefore, the waste heat from the electric machine 14 can be dissipated and used as required. As a result, the efficiency of the use of the vehicle energy is increased further.

What is claimed is:

1. A drive train of a motor vehicle, the drive train comprising:
   an electric machine having a coil and a rotor mounted rotatably relative to the coil;
   a liquid cooling device configured to supply a cooling liquid;
   a cooling circuit thermally connecting the liquid cooling device to at least one component of the electric machine to supply the cooling liquid from the liquid cooling device directly to the electric machine and to cool the at least one component of the electric machine;
   a fan having a suction side that communicates with ambient air and sucks in the ambient air;
   a fan pipe extending from the fan to the electric machine to supply ambient air directly to the electric machine for cooling the electric machine independently of the cooling liquid supplied by the cooling circuit; and
   a control unit for selectively activating or deactivating the fan to provide a flow of the cooling air based on a speed and/or a torque of the electric machine and for selectively activating or deactivating the liquid cooling device independently of the fan for controlling a supply of the cooling liquid in the cooling circuit depending on the speed and/or torque of the electric machine, so that the control unit activates the fan when the speed of the electric machine is below a predefined speed and interrupts the supply of the cooling liquid to the electric machine when the speed of the electric machine is above the predefined speed and the torque of the electric machine is below a predefined torque.

2. The drive train of claim 1, wherein the fan is designed to supply heated exhaust air from the electric machine to at least one component of the motor vehicle.

3. The drive train of claim 2, further comprising an air filter configured with the fan to filter the sucked-in ambient air.

4. A motor vehicle comprising the drive train of claim 1 for providing drive power.

5. The motor vehicle of claim 4, wherein a ventilation arrangement of an interior of the motor vehicle is connected to the fan of the electric machine so that heated exhaust air from the electric machine is supplied to the interior.

6. A method for cooling an electric machine of a motor vehicle, the electric machine having a coil and a rotor mounted rotatably relative to the coil, the method comprising:
   measuring a speed and/or a torque of the electric machine;
   using a control unit for selectively supplying a cooling liquid directly to the electric machine via a liquid cooling device and a liquid line to cool the electric machine depending on the measured speed and/or torque of the electric machine; and
   using the control unit for selectively operating a fan arrangement for supplying ambient cooling air directly to the electric machine for further cooling the electric machine, depending on the measured speed and/or torque of the electric machine, wherein
   the control unit activates the fan independently of supplying the cooling liquid to the electric machine for supplying the cooling air to the electric machine when the speed of the electric machine is below a predefined speed and deactivates the liquid supply for terminating the supplying of the cooling liquid to the electric machine when the speed of the electric machine is above the predefined speed and the torque of the electric machine is below a predefined torque.

7. The motor vehicle of claim 4, wherein the drive train is a hybrid drive train.

8. The method of claim 6, further comprising sucking the ambient cooling air through an air filter to produce filtered cooling air and then directing the filtered cooling air that has been heated by the electric machine to an interior compartment of the motor vehicle.

9. The motor vehicle of claim 4, wherein the motor vehicle has opposite first and second longitudinal ends, the liquid cooling device being in proximity to the first longitudinal end of the motor vehicle, the fan being in proximity to the second longitudinal end of the motor vehicle and the electric machine being between the liquid cooling device and the fan.

* * * * *